Figure 1:
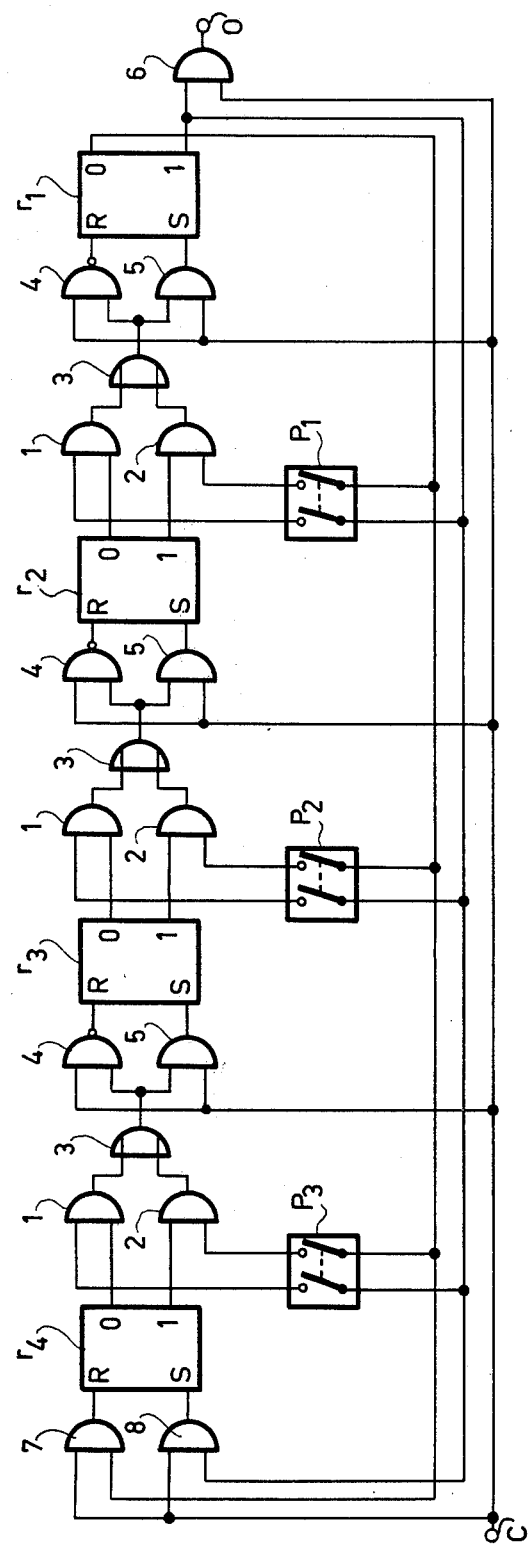

United States Patent [19]
Zetterberg et al.

[11] B 3,984,668
[45] Oct. 5, 1976

[54] METHOD FOR GENERATING PSEUDO-RANDOM BIT SEQUENCE WORDS AND A DEVICE FOR CARRYING OUT THE METHOD

[75] Inventors: Lars Henning Zetterberg; Leif Ake Arvidsson, both of Jarfalla, Sweden

[73] Assignee: U.S. Philips Corporation, New York, N.Y.

[22] Filed: Mar. 19, 1975

[21] Appl. No.: 559,737

[44] Published under the second Trial Voluntary Protest Program on January 20, 1976 as document No. B 559,737.

[30] Foreign Application Priority Data
Mar. 20, 1974 Sweden ............................. 7403748

[52] U.S. Cl. .................................. 235/152; 331/78
[51] Int. Cl.² ......................................... G06F 7/38
[58] Field of Search ............... 235/152, 156; 331/78

[56] References Cited
UNITED STATES PATENTS

| | | | |
|---|---|---|---|
| 3,746,847 | 7/1973 | Maritsas ............................. 235/152 |
| 3,777,278 | 12/1973 | Majeau et al. ......................... 331/78 |
| 3,811,038 | 5/1974 | Reddaway ............................ 235/152 |
| 3,838,259 | 9/1974 | Kortenhaus .......................... 235/152 |
| 3,881,099 | 4/1975 | Ailett et al. ........................... 235/152 |

*Primary Examiner*—Joseph F. Ruggiero
*Assistant Examiner*—Jerry Smith
*Attorney, Agent, or Firm*—Frank R. Trifari; Daniel R. McGlynn

[57] ABSTRACT

A method is obtained for generating pseudo-random bit sequence words which is characterized in that the bit contents of a given number of elements of the main register are used as an address for reading out from a memory of a corresponding superposition bit sequence of a length equal to the length of the main register and the bit sequence of a number of given elements of the main register are selected as a first word of the series.

4 Claims, 4 Drawing Figures

METHOD FOR GENERATING PSEUDO-RANDOM BIT SEQUENCE WORDS AND A DEVICE FOR CARRYING OUT THE METHOD

The invention is directed to a method for generating pseudo-random bit sequence words of 0's and 1's by means of registers, and a device for carrying out the method.

Modern data transmission systems, e.g. bank systems, are usually composed of a central computer having a large processing capacity and to which are connected a number of so-called concentrators having a more limited processing capacity, while each concentrator is connected to a larger number of terminal units comprising terminal computers of different data processing capacities. For obtaining data protection in a system of this kind ciphering by superposition may be used, which implies that the data sequencies before transmission in the system are superposed by means of a ciphering bit sequence, e.g. by modulo-2 addition of each of the data bits and the corresponding bits of the ciphering bit sequence. The protection obtained and therefore the security against deciphering is then entirely dependent on the quality of the ciphering bit sequence used, i.e., the random characteristics of sequence, which may be measured in terms of period lengths and random statistics.

It is previously known to generate such random bit sequences by means of linear feed-back coupled shift registers. Random sequence generators of this type will generate the random bit sequence bit by bit as a train of bits. This operation mode of previously known random sequence generators is a main disadvantage when using the same in modern data transmission systems of the type mentioned above, since the computers provided therein are arranged to perform the data processing on the word or byte level, which means that the bits comprised in each word, e.g. 8 bits, are processed in parallel. From this follows that in a computer of this type a complete word is processed with the same elapse of time as is required for processing each single bit. Therefore, so as to obtain a ciphering method which requires a minimum of cpu-time (central processor unit time) in a data transmission system very stringent requirements will have to be put on e.g. the operation speed of the random sequence generator.

The object of the invention is to provide a method and a device for generating a bit sequence in which the above-mentioned disadvantages with respect to operation mode and speed are eliminated.

According to the invention a method is obtained for generating pseudo-random bit sequence words which is characterized in that a series of the words each having a desirable number of bits of the sequence is generated by the steps: that a starting condition which is not entirely composed of 0's is supplied into a main register comprising a predetermined number of bistable elements; that the bit contents of a given number of elements of the main register are used as an address for reading out from a memory of a corresponding superposition bit sequence of a length equal to the length of the main register; that the bit sequence of a number of given elements of the main register, corresponding to the desirable word length, are selected as a first word of the series; that the bit sequence of the further elements of the main register after being modified by transposing the bits in accordance with a reproducible transposition pattern is superposed by the superposition bit sequence, while the result is simultaneously fed back into the main register; and in that the steps are thereafter repeated successively.

When using the method according to the invention at ciphering by means of superposition the ciphering may be carried out word by word instead of bit by bit which means that ciphering of one word is carried out with substantially the same elapse of time as is required for ciphering each single bit according to prior art. The gain of time obtained thereby is of a main importance in the area of data protection.

According to one embodiment of the method of the invention the words generated may be used as the address for reading out of the memory, and furthermore it is possible to use a transposition pattern implying displacing the contents of the further elements of the main register a given number of bit positions, while the superposition may be carried out by modulo-2-addition. This embodiment of the method according to the invention makes possible the generation of pseudo-random bit sequence words in which use is made of a main register having $m + n$ bistable elements designated as $m$ left and $n$ right elements, and is characterized in that the bit contents of the n right bistable elements is selected as a word of the series; that the word is used as an address for reading out of the memory of a corresponding one of $2^n$ superposition bit sequencies having the length of $m + n$ bits; that the further $m$ bits of the main register are placed $n$ bit positions to the right; that each bit of the superposition bit sequence and the corresponding bit of the register contents thus placed to the right is added modulo-2, while the result is simultaneously fed back into the respective main register element in which the superposition bit sequences are built up in a manner such that the new register contents obtained will always correspond to the bit sequence which may be obtained in a feedback coupled shift register after $n$ shift operations.

Although the method according to the invention may be used generally for generating pseudo-random bit sequences having arbitrary period lengths and random statistics it is possible according to one embodiment of the method of the invention to select the superposition bit sequences in a manner such that a bit sequence of a maximum length type is obtained of the kind which may be obtained by means of a feed-back coupled shift register the structural parameters, as herein defined, which represent the coefficients of a corresponding primitive feed-back coupling polynomial.

The superposition bit sequences required for generating a bit sequence of the type which may be obtained by means of the feed-back coupled shift register having $m + n$ shift register elements without feed-back couplings between the n last elements, such a register is described hereinafter in accordance with the drawings.

A device for carrying out the method according to the invention may be arranged in different manners dependent on the intended use. For ciphering of the kind mentioned above a preferred embodiment is characterized in that it is composed of: a main register (R1) having $m+n$ bistable elements; designated as $m$ left and $n$ right elements; a register (R2) 2having an appropriate number of bistable elements and being arranged to collect for further use the successively generated words of the pseudo-random bit sequence; an address register (AR) having $n$ elements which are, respectively, connected in parallel to the $n$ right elements of the main register; a memory (M) having $2^n$ positions each of the capacity $m + n$ bits for storing the $2^n$ superposition bit sequences and the address input of which is connected to the output of the address register; a first addition register (ADDR1) having the capacity of $m + n$ bits for storing temporaneously each of the superposition bit sequences which are supplied from the memory; a second addition register (ADDR2) for storing temporaneously and shifting to the right by $n$ steps the bit sequence of the $m$ left elements of the main register; an addition device (2-ADD) having 2 $(m + n)$ inputs connected to corresponding outputs of the first and the second addition register and having $m + n$ outputs being connected to the respective inputs of the corresponding elements of the main register for addition modulo-2 of the contents of the first and second addition registers while feeding back simultaneously the result into the main register.

Figure 2:
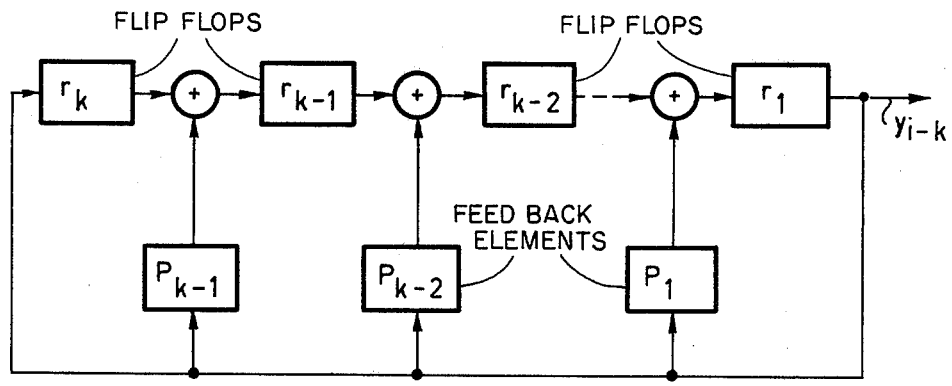
Figure 4:
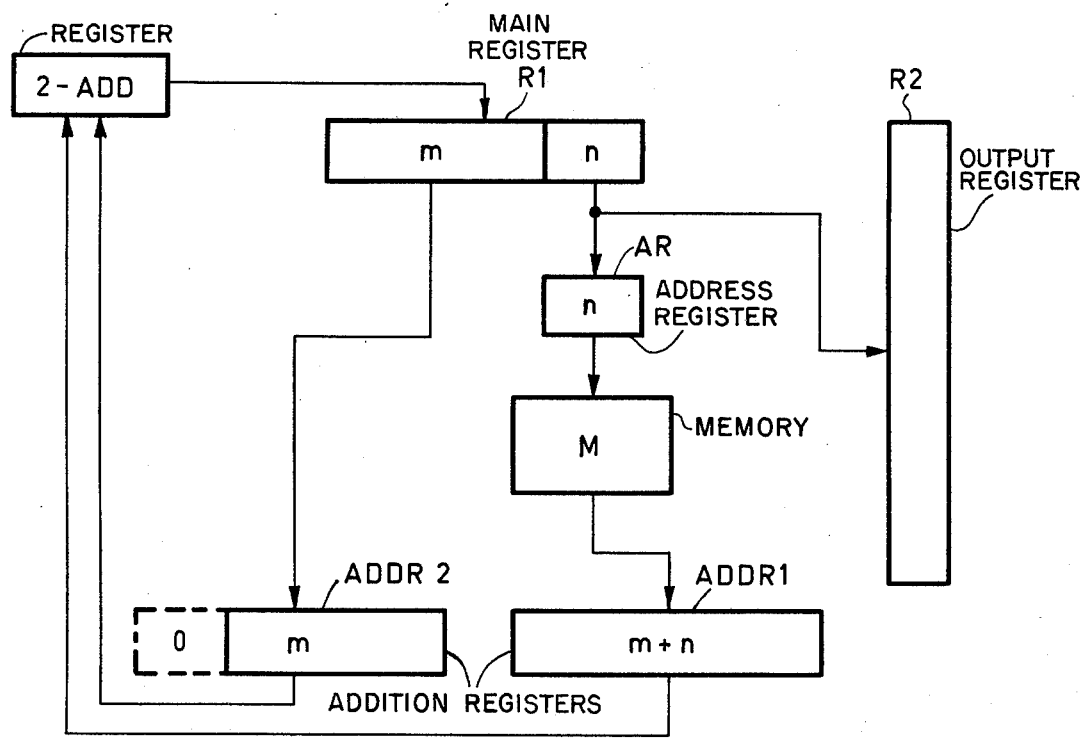
Figure 3:
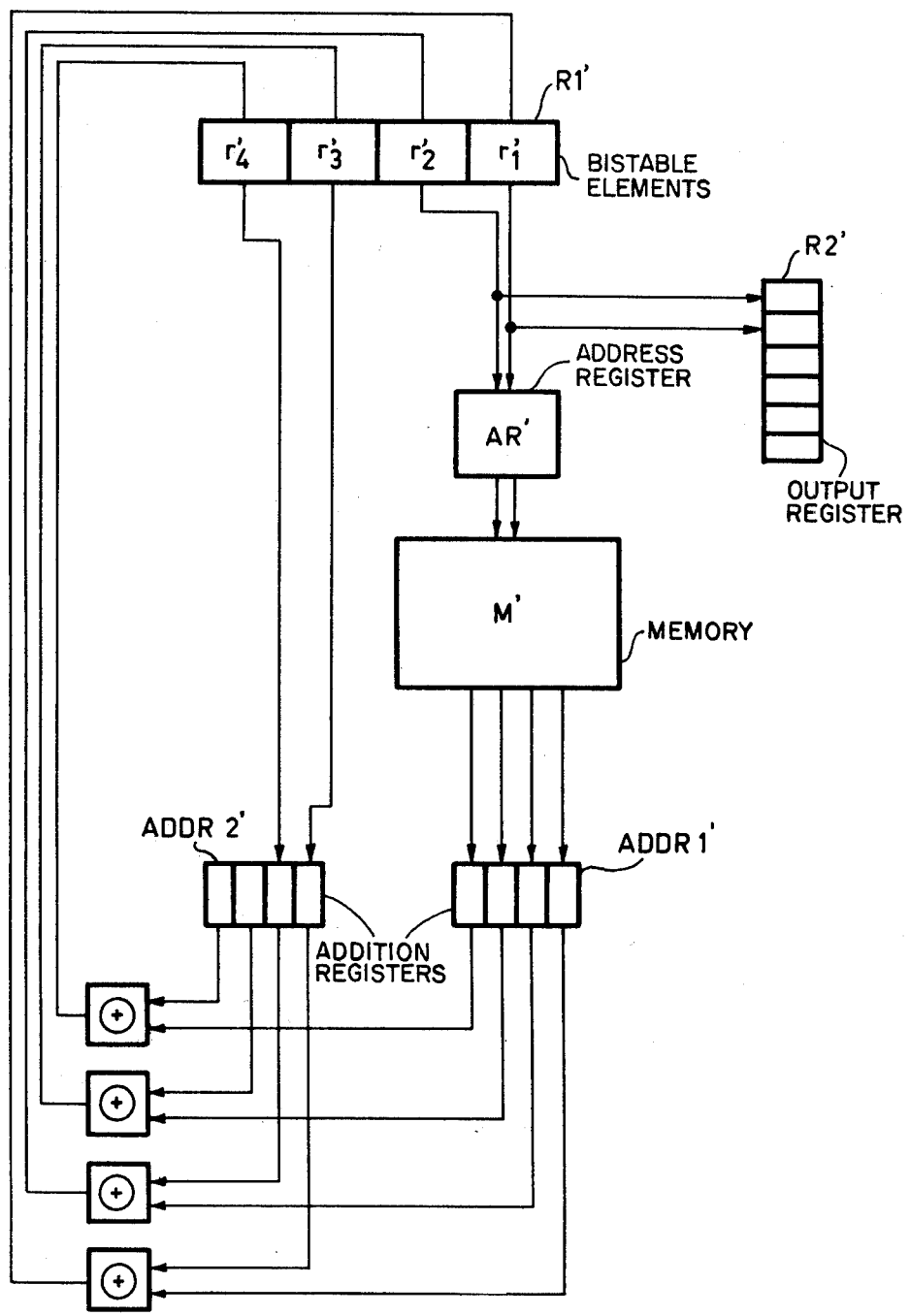

The invention will be described more closely in the following with reference to the drawings, in which:

FIG. 1 discloses a logic circuit diagram of a known feed-back coupled shift register;

FIG. 2 shows a block diagram of a generalized embodiment of a shift register of the type shown in FIG. 1;

FIG. 3 discloses a logic diagram of a simplified embodiment of a device for carrying out the method according to the invention; and FIG. 4 shows a block diagram of a generalized embodiment of the device disclosed in FIG. 3 for carrying out the method according to the invention.

The shift register of FIG. 1 is composed of four bistable elements $r_1$–$r_4$, each of which comprises one so-called SR-flip-flop having one SET input (S) and one RESET input (R) and a 1-output (1) and a 0 output (O). Each of the flip-flops may be so shaped that when a high voltage is supplied to the S-input from the corresponding input AND-gate then the 1-output will deliver a high voltage. The same holds for the R-input, i.e., a high voltage will be supplied from the 0-output when the R-input signal is high. The output signal of the flip-flop $r_1$ is feed-back coupled to the different flip-flops through elements $p_1$–$p_3$, each of which is represented by a double pole two-position switch. A desirable feed-back pattern may be obtained by closing a number of the switches. The output signal of the shift register is always supplied to the input of flip-flop $r_4$ and therefore no corresponding feed-back element ($p_4$) is shown for this flip-flop. The output bit sequence of the shift register may be obtained at the output 0 of an output AND-gate 6. The output signals of flip-flops $r_2$–$r_4$ are added modulo-2 to the feed-back signal supplied by elements $p_1$–$p_3$. This addition modulo-2 is obtained by means of so-called half-adders each comprising AND-gate 1, 2 and an OR-gate 3. The output of OR-gate 3 is fed to the R- and S-inputs of the following flip-flop by means of clocked NAND- and AND-gates 4 and 5 respectively. The clock pulse signal for controlling the input gates 7, 8 of flip-flop $r_4$ and the input gates 4, 5 of flip-flops $r_1$–$r_3$, and the output gate 6 is obtained from a clock pulse generator on line C.

Assuming that switch elements $p_3$ and $p_1$ are closed while element $p_2$ is left open, and furthermore assuming that the initial condition of the shift register is 0110 in the flip-flops $r_1$–$r_4$ respectively, which means that the output voltage level of the 1-output of flip-flops $r_1$, $r_4$ is low and that it is high at elements $r_2$, $r_3$. This assumption means that the shift register will produce at the output 0 during the next following five clock pulses appearing on line C the output bit sequence 01001, and at this stage the contents of flip-flops $r_1$–$r_4$ will be 1000, respectively. This process may be continued and in this manner may be obtained a pseudo-random bit sequence the length of which is dependent on the number of flip-flops used and the switching conditions of the feed-back elements p.

In FIG. 2 is shown a block diagram of a generalized shift register according to FIG. 1 and comprising a number of $k$ flip-flops $r_1$, $r_2$ ..., $r_k$. Consequently this embodiment also comprises the feed-back elements $p_1$, $p_2$ ..., $p_{k-1}$. The modulo-2 operation performed on the output signals of the flip-flops and the feed-back signal is indicated by the symbol commonly used therefore, namely an encircled +sign, and may be implemented as shown in FIG. 1 The feed-back elements $p_1$, $p_2$ ..., $p_{k-1}$ are shown as blocks each of which may comprise a switch as indicated in FIG. 1. The clocked input gates and output gate of FIG. 1 have been left out of consideration. The shift register may be represented by a corresponding so-called feed-back coupling polynomial $$p(x) = 1 + p_1x + p_2x^2 + ... + p_{k-1}x^{k-1} + p_kx^k$$

in which each of the elements $p$ appears as a coefficient which has a value of 1 when the corresponding switch is closed and a 0 when the switch is open. In this specific case $p_k$ is equal to $l$ since the output of flip-flop $r_l$ is connected directly to the input of flip-flop $r_k$. It may be shown theoretically that from the register of FIG. 2 may be obtained an output bit sequence $y_1$, $y_2$, ..., according to the recursive formula $$y_i = p_1y_{i-1} + p_2y_{i-2} + ... + p_ky_{i-k}$$

in which $y_{i-k} = r_{1(i)}$ stands for the output signal of flip-flop $r_1$ after a number of $i$ shift operations.

From this follows that with a knowledge of the k previously generated bits $y_i$, i.e., the bits $y_{-k+1}$, $y_{-k+2}$ ..., $y_o$, the output bit sequence $y_1$, $y_2$, ... may be calculated from the above recursive relation with $i = 1, 2, ...$ The output bit sequence is generated in series form, which means that one bit of the sequence is generated for each clock pulse supplied to the shift register. As mentioned above this bit by bit operation mode is a main disadvantage when used in a modern data transmission system. However, the disadvantage may be eliminated by the method according to the invention which makes possible a word by word generation of the output bit sequence which may be obtained from the shift register of FIG. 2.

In the following will be described a device for carrying out one embodiment of the method according to the invention which allows word by word generation of the output bit sequence which is obtained from a feed-back coupled shift register of the type disclosed in FIG. 2 having $m + n$ flip-flop elements $r_1$, $r_2$ ..., $r_{m+n}$ and having no feed-back elements between the last $n$ elements, i.e., the coefficients $p_1$, $p_2$, ..., $p_n$, which are also called the structural parameters of the shift register, are all equal to 0. This embodiment of the method is favorable since it allows a simplification and thereby a speeding-up of the device for carrying out the method. An idea of the background to the simplification and elevated operation speed may be obtained from the observation that in a shift register of the type disclosed in FIG. 2 and with no feed-back elements between the $n$ flip-flops located adjacent to the output, the output bit sequence which is obtained during stepping forward successively the shift register $n$ steps is also accessible simultaneously as a word of bits which is located in the $n$ last elements. This is due to the fact that the bit-contents of the flip-flops is just fed forward during stepping without being interfered by the feed-back bits.

The method according to the invention is based on the observation which may also be proved mathematically, that it is possible for a shift register of the type disclosed in FIG. 2 to find a relation between the bit-contents of the shift register elements, i.e., the flip-flops, at an initial stage and the bit-contents after having stepped forward the shift register a given number of steps, and furthermore the fact that the output bit sequence obtained thereby may be expressed in terms of the initial bit-contents. It is assumed thereat that the number of steps is smaller than the number of flip-flops of the shift register. With respect to the shift register embodiment discussed above, i.e., a shift register having no feed-back couplings between the $n$ last elements, this means that the bit sequence contained in said last $n$ flip-flops may be used as an output bit word and that it is possible to calculate in beforehand superposition bit sequences of a length equal to $m + n$, which when superposed on the bit-contents of the remaining $m$ flip-flops will result in a new bit-contents of the shift register equal to the bit-contents which would be obtained after stepping forward the shift register $n$ steps. This has initiated a device of the type shown in FIG. 3, which discloses a logic circuit diagram of a simplified embodiment for carrying out the method according to the invention.

The device of FIG. 3 is composed of a register comprising four bistable elements $r'_1$, $r'_2$, $r'_3$, $r'_4$, each of which may comprise a flip-flop of the type disclosed in FIG. 1. However, different from the register of FIG. 1 the actual register is not able to perform shift operations, which is not required since the shift operations are simulated by means of the superposition bit sequences mentioned above. At least one of the flip-flops holds a 1 in the initial condition. The output of the elements $r'_1$, $r'_2$ are connected to the inputs of an input means called address register AR' which is arranged to supply the bits of the two elements as a binary address to the address inputs of a memory M'. The two bits are also used as an output word which is supplied to an output register R'2 in which the bit words generated are collected for further use. The memory M' is a digital memory which in different positions holds a number of superposition bit sequences equal to the number of different addresses which may be supplied from AR', i.e., in the present case memory M' holds four different superposition bit sequences. The outputs of memory M' supply in parallel a relevant superposition bit sequence to the respective positions of a first addition register ADDR1' and the respective outputs of register ADDR1' are connected to the respective second inputs of four modulo-2 adders. Each of the adders may comprise a half-adder of the type disclosed in FIG. 1. The output bits of element $r'_4$ and $r'_3$ of register R1' are supplied to the inputs of a second addition register ADDR2' in such a manner that a shift right operation two steps of the bits is simulated ADDR1' and ADDR2' are disclosed as registers, but nevertheless no real register function takes place and the main object for the elements is to introduce delays of such an amount that the output bits of memory M' and the flip-flops $r'_3$, $r'_4$ will be supplied simultaneously to the inputs of the modulo-2 adders. The superposition result supplied by the adders is then fed into the corresponding elements of register R1'. As should be evident to anyone skilled in the art the operation of the device described is controlled by a clockpulse signal supplied thereto, which means that input gates are provided at the inputs of registers R1' and R2', but for the sake of simplicity the functions have been omitted. The process described will proceed continuously and every new two bits are supplied to the output register R2' as a new output word and as an address to the memory M', while the superposition sequence obtained therefrom is superposed by addition modulo-2 on the sequence contained in the remaining flip-flops of R1', i.e., or $r'_3$, $r'_4$, after a shift two steps to the right of the contents has been simulated by means of the element ADDR2'. In FIG. 3 this simulated shift operation is indicated in that register ADDR2' has four register elements in spite of the fact that the two left elements are not necessary.

In FIG. 4 is shown a block diagram of a generalized embodiment of the device shown in FIG. 3. This embodiment is composed of a main register R1 comprising $m + n$ bistable elements, i.e., for example flip-flops of the type disclosed in FIG. 1. The $n$ output bits of the $n$ right elements of the register is supplied as an output word to an output register R2. The bits are also supplied to an address register AR and therefrom to the address inputs of a digital memory M. Memory M has $2^n$ different positions each of which is accessible by means of a corresponding address supplied from the register R1. A relevant superposition sequence is supplied from memory M to register ADDR1 having $m + n$ positions and in which the sequence is stored temporarily. The $m$ left bits of the main register R1 are supplied to a second register ADDR2 and simultaneously shifted to the right $n$ steps. The shift operation is indicated in register ADDR2 by a 0 in its $n$ left positions. The output sequences of register ADDR1 and ADDR2 are added modulo-2 in the added denoted 2-ADD, and the output bit sequence therefrom, which consists of $m + n$ bits, is supplied in parallel to the inputs of the respective elements of register R1. And this operation ends the generation of one output bit word. Thereafter a new address and output word is supplied from the $n$ right elements of register R1 and the described sequence of operations is continued successively.

In FIGS. 3 and 4 the output word generated by register R1 is also used as an address for reading out a corresponding superposition sequence. However, both the address and the output word may be selected from arbitrary positions of register R1. Similarly the shift right operation of the remaining bits of the register R1 may be replaced by a transposition operation by means of which the remaining bits are transposed according to a reproducible transposition pattern.

In FIG. 4 as in FIG. 3 all control circuitry required for the operation of the device is left without consideration. In this respect may be referred to FIG. 1 and it should be obvious to anyone skilled in the art that a similar set-up of control gates may be used in the device of FIG. 4. It should be noted, however, that the set of operations disclosed for the generation of one word of bits takes place during the one and same control clock pulse. Therefore in comparison with shift register of FIG. 2, which produces one output bit for each clock pulse supplied thereto, the device disclosed in FIG. 4 will generate a bit word comprising $n$ bits during the same elapse of time. From this follows that the operation speed has been increased by a factor $n$. By an adequate selection of the structural parameters $p_1, p_2$ ...

of the shift register of FIG. 2 it is possible to obtain any desirable period length and probability distribution of 0 and 1 in the bit sequence generated. Specifically, if the structural parameters are selected in accordance with the coefficients of a so-called primitive polynomial it is possible to obtain a maximum length sequence, the bit length of which is $L = 2^{n+m} - 1$. Similarly any desirable output bit sequence may be generated by means of the device of FIG. 4, but in this case this is obtained instead by choosing suitably the superposition bit sequences stored in memory M and the transposition pattern used for the remaining bits of register R1.

The superposition bit sequences required for the generation of a bit sequence of the type which may be obtained by means of a feed-back coupled shift register having $m + n$ shift register elements with no feed-back couplings between the $n$ last elements, are derived from a bit sequence defined by the structural parameters of the shift register and shifted versions of the bit sequence. This bit sequence and its shifted versions may be called basic bit sequences having running numbers from 1 to $n$ and a bit length of $m + n$ bits. The desirable superposition bit sequences are provided with binary running numbers (addresses) comprising in this example $n$ bits. For each 1 of such a binary running number is selected the basic bit sequence having a running number which corresponds to the positional notation number of the 1, and thereafter the superposition bit sequence is built up by addition modulo-2 of corresponding bits of the basic bit sequences obtained thereby.

In order to make clearer this principle a numerical example will follow below which example will be directed to the embodiment of FIG. 3, and the superposition bit sequences to be stored in memory M' will be generated so as to simulate the shift register of FIG. 1 with parameters $p_1 = p_2 = 0$ and $p_3 = p_4 = 1$ and holding in its respective flip-flops $r_4$, $r_3$, $r_2$, $r_1$ the initial bit sequence 1010. When this shift register is shifted to the right step by step the bit contents of the respective elements $r_4$, $r_3$, $r_2$, $r_1$ will change as follows 1010, 0101, 1110, 0111, 1111, 1011, 1001, 1000, 0100, 0010, 0001, 1100, 0110, ..., and at the output 0 is generated the output bit sequence 010111100010 ...

According to the invention the structural parameter bit sequence $p_4$, $p_3$, $p_2$, $p_1$ will be equal to 1100. In this example $n = 2$ and accordingly there are two basic bit sequences $P_1 = 1100$ with running number 1, and $P_2 = 0110$, i.e., $P_1$ shifted one step to the right, with running number 2. Since the address comprises $n = 2$ bits four different addresses will be obtained, namely 00, 01, 10, 11, which are also the binary running numbers of superposition bit sequences. The rule presented above will then provide the superposition sequences 0000 (address 00), 0110 = $P_1$ (address 01), 1100 = $P_2$ (address 10), and 1010 = $P_1 + P_2$ (address 11). This is also shown in table form below.

| Basic sequences: | | | |
|---|---|---|---|
| number 1 | 1100 | | |
| number 2 | 0110 | | |
| Address | 1's position in address | Basic sequence(es) | Superposition sequence |
| 00 | — | — | 0000 |
| 01 | 2 | 0110 | 0110 |
| 10 | 1 | 1100 | 1100 |
| 11 | 1,2 | 1100, 0110 | 1010 |

Using the superposition bit sequences mentioned above and the initial bit-contents 1010 of register R1' of FIG. 3, then a first output bit word equal to 10 will be generated and used as an address, which will pick up from memory M' the corresponding superposition bit sequence 1100 to be superposed on the remaining bits of register R1' shifted two steps to the right, i.e., 0010. This will result in the new contents 1110 in R1'. In the same manner will be generated the following output bit words and corresponding new contents of R1': word 10 and contents 1111, word 11 and contents 1001, word 01 and contents 0100, word 00 and contents 0001, word 01 and contents 0110. From this follows that the generated sequence of output words when read successively from right to left will produce the bit sequence 010111100010 ... This output sequence corresponds to the output bit sequence mentioned above and generated by the corresponding feed-back coupled shift register.

The different register contents and output sequences generated by the shift register of FIG. 1 and the device of FIG. 3 in the above example are presented in the table below.

| Shift register | | | | Device of FIG. 3 | | |
|---|---|---|---|---|---|---|
| Shift | $r_4r_3r_2r_1$ | Out | Operation | R1' | AR' = Out | From M' |
| 0 | 1010 | — | 0 | 1010 | | |
| 1 | 0101 | 0 | | | | |
| 2 | 1110 | 1 | 1 | 1110 | 10 | 1100 |
| 3 | 0111 | 0 | | | | |
| 4 | 1111 | 1 | 2 | 1111 | 10 | 1100 |
| 5 | 1011 | 1 | | | | |
| 6 | 1001 | 1 | 3 | 1001 | 11 | 1010 |
| 7 | 1000 | 1 | | | | |
| 8 | 0100 | 0 | 4 | 0100 | 01 | 0110 |
| 9 | 0010 | 0 | | | | |
| 10 | 0001 | 0 | 5 | 0001 | 00 | 0000 |
| 11 | 1100 | 1 | | | | |
| 12 | 0110 | 0 | 6 | 0110 | 01 | 0110 |

From this table it is obvious that one operation of the device according to the invention is equivalent with two shifts of the shift register and that the register contents appearing thereat are identical.

What is claimed is:

1. A method for generating pseudo-random bit-sequence words consisting of 0's and 1's by means of registers, and a series of such words each having a predetermined number of bits comprising the steps of
supplying a starting bit pattern which is not entirely composed of 0's into a main register which comprise a predetermined number $m + n$ of bistable elements, where $m$ and $n$ are integers;
using the bit-contents of a predetermined number $n$ of said elements of said main register as an address for reading out from a memory a corresponding superposition bit-sequence having a length equal to the length of said main register;
selecting the bit-sequence of predetermined ones of said elements of said main register, corresponding to a word length of $n$ bits as a first word of said series;
modifying the bit sequence of the remaining $m$ ones of said elements of said main register by transposing the bits in accordance with a predetermined reproducible transposition pattern; and
simultaneously feeding back the result of said modifying step into the main register.

2. A method as claimed in claim 1 for generating pseudo-random bit sequence words, wherein said main register has $m + n$ bistable elements designated as $m$ left and $n$ right elements, wherein the bit-contents of the $n$ right bistable elements is selected as a word of said series; further comprising the steps of:

using said word as an address for reading out from said memory a corresponding superposition bit sequence having the length of $m + n$ bits;

placing the further $m$ bits of the main register $n$ bit positions to the right;

adding modulo-2 each bit of the superposition bit sequence and the corresponding bit of the register contents thus placed to the right;

feeding back the result simultaneously into the respective main register element so that the superposition bit sequences are built up in such a manner so that the new register contents obtained will correspond to the bit sequence which is obtainable in a feedback coupled shift register after $n$ shift operations.

3. A method as claimed in claim 2, further comprising the step of selecting the superposition sequences for obtaining a pseudo-random bit sequence of a maximal length by means of a feedback coupled shift register, having structural paramaters which represent the coefficients of a corresponding primitive feedback coupling polynomial, of the degree $m + n$.

4. A device for generating pseudo-random bit sequence words, comprising a main register having $m + n$ bistable elements, designated as $m$ left and $n$ right elements, where $m$ and $n$ are positive integrers; and inputs corresponding to said bistable elements;

a secondary register having a predetermined number of bistable elements and adapted to collect the successively generated words of the pseudo-random bit sequence;

an address register having $n$ elements which are, respectively, connected in parallel to the $n$ right elements of the main register, and an output;

a memory having $2^n$ positions each having the capacity of $m + n$ bits for storing $2^n$ superposition bit sequences, and having an address input connected to said output of said address register;

a first addition register having the capacity of $m + n$ bits for temporarily storing each of the superposition bit sequences which are supplied from said memory; and having an output;

a second addition register for storing temporarily and shifting to the right by $n$ steps the bit sequence of the $m$ left elements of the main register, and having an output; and an addition device having $2(m + n)$ inputs connected to corresponding outputs of said first and the second addition registers, and having $m + n$ outputs connected to the respective inputs of the corresponding bistable elements of said main register, for addition modulo-2 of the contents of said first and second addition registers while feeding back simultaneously the result into said main register.

* * * * *